(12) United States Patent
Struziak et al.

(10) Patent No.: US 7,648,279 B2
(45) Date of Patent: Jan. 19, 2010

(54) JOURNAL AIR BEARING

(75) Inventors: Ronald M. Struziak, Longmeadow, MA (US); Christopher McAuliffe, Windsor, CT (US); Jeffery L. Stark, Niantic, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 505 days.

(21) Appl. No.: 11/786,637

(22) Filed: Apr. 12, 2007

(65) Prior Publication Data
US 2008/0253704 A1 Oct. 16, 2008

(51) Int. Cl.
*F16C 32/06* (2006.01)
(52) U.S. Cl. .................................... 384/103; 384/106
(58) Field of Classification Search .......... 384/103–106
See application file for complete search history.

(56) References Cited

U.S. PATENT DOCUMENTS

| | | | |
|---|---|---|---|
| 3,809,443 A | 5/1974 | Cherubim | |
| 4,552,466 A | 11/1985 | Warren | |
| 4,767,222 A | 8/1988 | Paletta et al. | |
| 5,427,455 A | 6/1995 | Bosley | |
| 5,658,079 A | 8/1997 | Struziak et al. | |
| 6,921,207 B2 | 7/2005 | Matsunaga | |
| 6,953,283 B2 | 10/2005 | Matsunaga | |
| 6,997,613 B2 | 2/2006 | Katou et al. | |
| 7,056,025 B2 | 6/2006 | Nakata | |

FOREIGN PATENT DOCUMENTS

EP 1 566 556 A2 8/2005

OTHER PUBLICATIONS (Second) Official Search Report of the European Patent Office in counterpart foreign Application No. 08250625.4 filed Feb. 22, 2008.
Official Search Report of the European Patent Office in counterpart foreign Application No. 08250625.4 filed Feb. 22, 2008.

*Primary Examiner*—Thomas R Hannon
(74) *Attorney, Agent, or Firm*—Kinney & Lange, P.A.

(57) ABSTRACT

A hydrodynamic fluid film journal bearing assembly includes a journal sleeve having a key slot formed therein in a substantially longitudinal direction, a bump foil wrapped in a substantially cylindrical shape adjacent to the journal sleeve and having a bent end portion engaged with the key slot, an intermediate foil wrapped in a substantially cylindrical shape adjacent to the bump foil, a top foil wrapped in a substantially cylindrical shape adjacent to the intermediate foil, a first top foil cutout window formed adjacent to the bent region, and a first end tab formed at a free end of the top foil. The first end tab is wrapped with the top foil in the substantially cylindrical shape of the top foil, and extends into the first top foil cutout window to reduce skewing. The top and intermediate foils are joined at a bent region that engages the key slot.

24 Claims, 4 Drawing Sheets

JOURNAL AIR BEARING

BACKGROUND

The present invention relates to hydrodynamic fluid film bearing assemblies, and methods of manufacturing the same.

Hydrodynamic fluid film journal bearings, also called journal air bearings or foil bearings, can be used to provide support to rotatable components such as shafts. A typical prior art bearing assembly of this type (e.g., as disclosed by U.S. Pat. No. 5,658,079), includes a journal sleeve, a bump foil, an intermediate foil, and a top foil. The bump foil, the intermediate foil and the top foil are wrapped inside the journal sleeve in a substantially cylindrical shape, and those foils are positioned between the journal sleeve and the rotatable component. Each foil has an end that is engaged to the journal sleeve, and can have another end that is free (i.e., not engaged to the journal sleeve). During operation, rotation of the rotatable component causes a working fluid to form a cushion (often referred to as an "air bearing") that supports the rotatable component with little or no direct contact between the rotatable component and the foils of the bearing.

A problem frequently encountered with hydrodynamic fluid film journal bearings is "skewing", which refers to movement of a free end of a foil in a generally axial direction. Skewing causes a foil to become more conically shaped, which reduces diameters inside the foil and causes tightening relative to the rotatable component supported by the bearing. Tightening of foils is undesirable because it can interfere with working fluid (or cooling fluid) movement, and can increase torque on the rotatable component.

SUMMARY

A hydrodynamic fluid film journal bearing assembly includes a journal sleeve having a key slot formed therein in a substantially longitudinal direction, a bump foil wrapped in a substantially cylindrical shape adjacent to the journal sleeve and having a bent end portion engaged with the key slot, an intermediate foil wrapped in a substantially cylindrical shape adjacent to the bump foil, a top foil wrapped in a substantially cylindrical shape adjacent to the intermediate foil, a first top foil cutout window formed adjacent to the bent region, and a first end tab formed at a free end of the top foil. The first end tab is wrapped with the top foil in the substantially cylindrical shape of the top foil, and extends into the first top foil cutout window to reduce skewing. The top and intermediate foils are joined at a bent region that engages the key slot.

DETAILED DESCRIPTION

The present invention, in general, provides an improved hydrodynamic fluid film journal bearing assembly that is relatively simple and easy to fabricate and assemble. Furthermore, the improved hydrodynamic fluid film journal bearing assembly of the present invention helps to reduce or eliminate problems of "skewing", which refers to undesirable movement of a free end of a foil of the bearing assembly in a generally axial direction. In addition, the configuration of the improved hydrodynamic fluid film journal bearing assembly allows for reworking of components during fabrication and assembly, thereby helping to reduce the amount of scrap produced and to reduce manufacturing costs.

Figure 1:
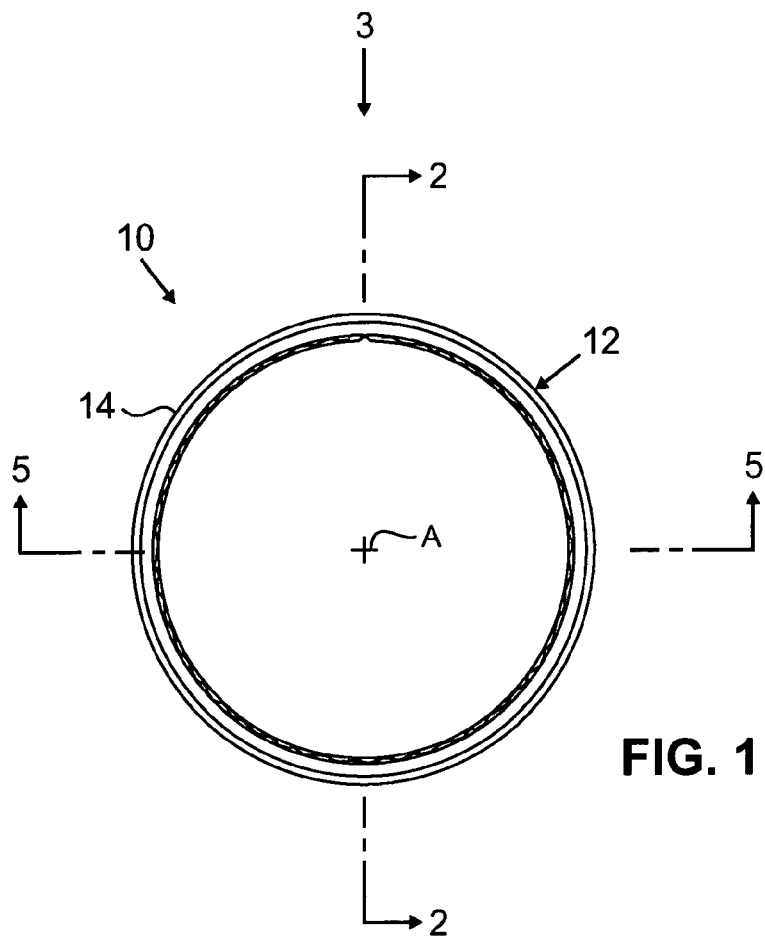
FIG. 1 is an end view of a hydrodynamic fluid film journal bearing assembly according to the present invention.
Figure 2:
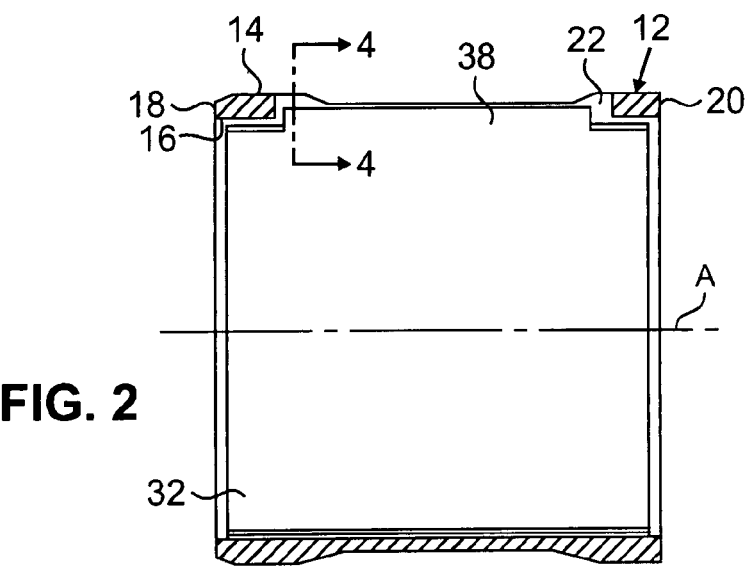
FIG. 2 is a cross-sectional view of the hydrodynamic fluid film journal bearing assembly, taken along line 2-2 of FIG. 1.

FIG. 1 is an end view of a hydrodynamic fluid film journal bearing assembly 10. FIG. 2 is a cross-sectional view of the bearing assembly 10, taken along line 2-2 of FIG. 1. As best shown in FIG. 2, the bearing assembly 10 includes a journal sleeve 12 that defines an outer diameter surface 14, an inner diameter surface 16, a first end 18, and a second end 20. The journal sleeve 12 is arranged about a central axis A. It should be noted that the journal sleeve 12 can have a conventional cylindrical shape, or alternatively can be shaped with a weight-reduced profile in the manner disclosed by commonly-assigned U.S. patent application Ser. No. 11/786796, entitled "Weight Reduction for Journal Air Bearing," filed on even date herewith, which is hereby incorporated by reference in its entirety.

Figure 3:
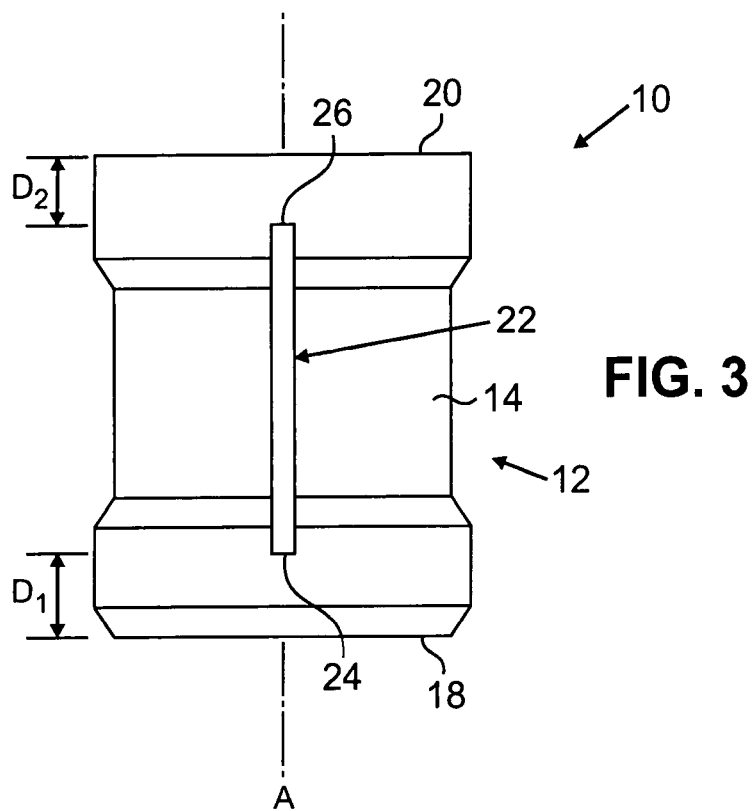
FIG. 3 is a top view of the hydrodynamic fluid film journal bearing assembly.

A key slot 22 (or keyway) is formed in the journal sleeve 12, and the key slot 22 extends entirely through a sleeve wall defined between the outer and inner diameter surfaces 14 and 16 of the journal sleeve 12. FIG. 3 is a top view of the exterior of the bearing assembly 10 (structures that would otherwise be visible through the key slot 22 have been omitted in FIG. 3 for clarity). As shown in FIG. 3, the key slot 22 has an elongate, substantially rectangular shape that is arranged generally parallel to the axis A. The key slot 22 has a first end 24 that is spaced from the first end 18 of the journal sleeve 12 a distance $D_1$, and has a second end 26 that is spaced from the second end 20 of the journal sleeve 12 a distance $D_2$. In one embodiment, distance $D_1$ is greater than distance $D_2$, such that the key slot 22 is axially (or longitudinally) offset with respect to a length of the journal sleeve 12. The key slot 22 can be offset in this manner for assembly foolproofing purposes, as explained further below. In alternative embodiments, the key slot 22 can be axially centered relative to the journal sleeve 12.

Figure 4:
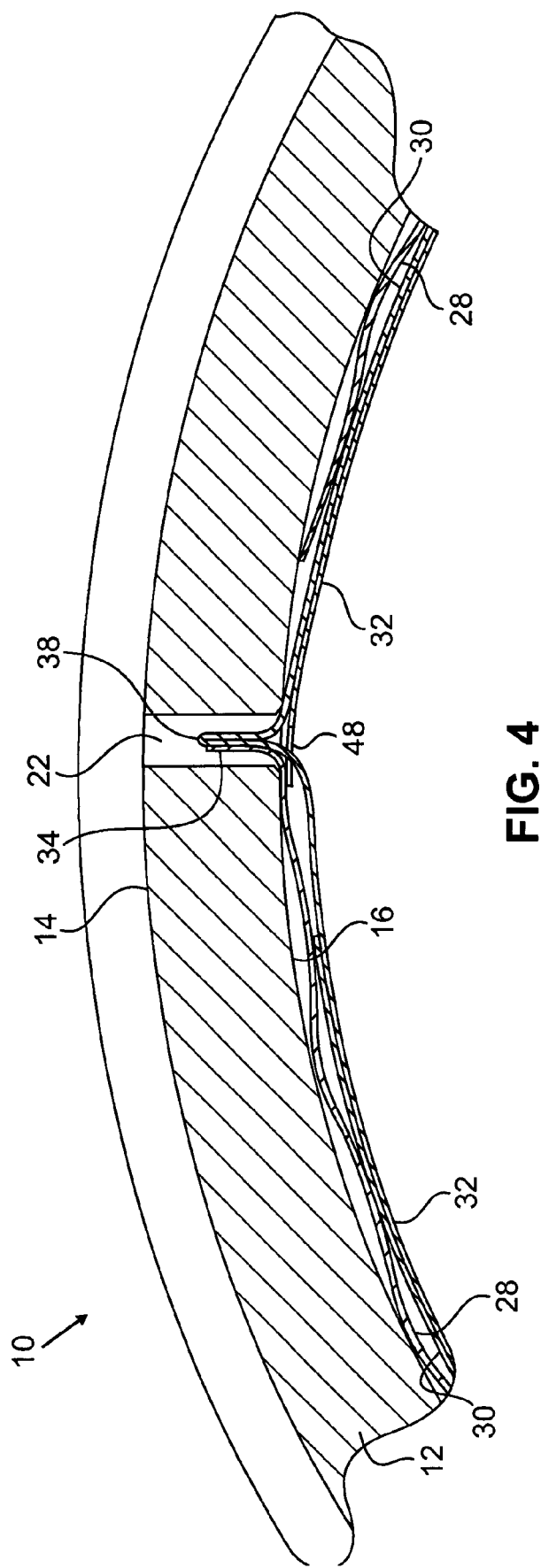
FIG. 4 is a cross-sectional view of the hydrodynamic fluid film journal bearing assembly, taken along line 4-4 of FIG. 2.

A number of foils are arranged inside the journal sleeve 12. FIG. 4 is an enlarged cross-sectional view of the bearing assembly 10, taken along line 4-4 of FIG. 2. As shown in FIG. 4, the bearing assembly 10 further includes a bump foil 28, an intermediate foil 30 and a top foil 32. The bump foil 28, the intermediate foil 30 and the top foil 32 are each thin sheets of material (e.g., nickel-based alloys or steel) wrapped in a generally cylindrical shape and positioned in a bore of the journal sleeve 12. The bump foil 28 is corrugated, allowing a working fluid or cooling fluid to flow through spaces formed between adjacent corrugations. The bump foil 28 is positioned adjacent to the inner diameter surface 16 of the journal sleeve 12, and has a bent end 34 that extends radially outward at least partially into the key slot 22 in order to engage the key slot 22 and retain the bump foil 30 relative to the journal sleeve 12. The bent end 34 of the bump foil 28 can be angled at approximately 90° with respect to an adjacent, generally cylindrical portion of the bump foil 28.

The intermediate foil 30 is positioned adjacent to and radially inward from the bump foil 28, and the top foil is positioned adjacent to and radially inward from the intermediate foil 30. The intermediate foil 30 and the top foil 32 are joined together at a bent region 38 that extends radially outward at least partially into the key slot 22, in order to engage the key slot 22 and retain both the intermediate and top foils 30 and 32 relative to the journal sleeve 12. The bent region 38 can be angled at approximately 90° with respect to adjacent, generally cylindrical portions of the intermediate foil 30 and the top foil 32. In one embodiment, the intermediate foil 30 and the top foil 32 are formed by opposite end portions of a single integral sheet that join at the bent region 38, located in a middle portion of the integral sheet. In an alternative embodiment, the intermediate foil 30 and the top-foil 32 are formed from separate sheets connected together at the bent region 38 using welding, brazing or other suitable attachment means.

A rotatable component like a shaft (not shown) can be positioned inside the bearing assembly, radially inward from the top foil 32. Such a rotatable component would typically rotate clockwise with respect to the cross-section of the bearing assembly 10 shown in FIG. 4. A radially inner surface of the top foil 32 exposed to the rotatable component can optionally be coated with a suitable dry film lubricant. Use of such a dry film lubricant can reduce friction caused by the rotatable component when accelerating to operating speed, when decelerating from operating speed, when stopped, and when subject to incidental contact with the top foil 32 during regular operation.

Figure 5:
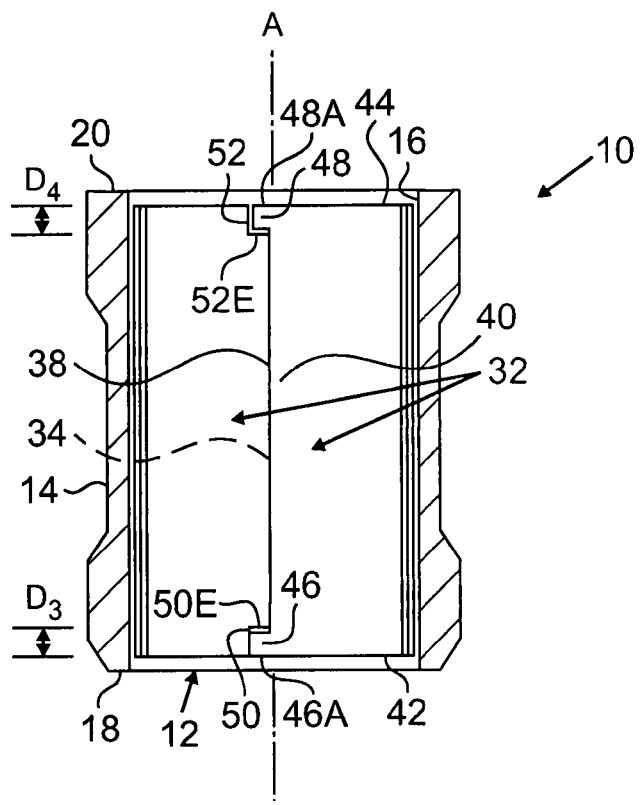
FIG. 5 is a cross-sectional view of the hydrodynamic fluid film journal bearing assembly, taken along line 5-5 of FIG. 1.

FIG. 5 is a cross-sectional view of the bearing assembly 10, taken along line 5-5 of FIG. 1. As shown in FIG. 5, the top foil 32 defines a free end 40, and opposite first and second side edges 42 and 44, respectively. A first end tab 46 extends from the free end 40 of the top foil 32 at the first side edge 42, and a second end tab 48 extends from the free end 40 of the top foil 32 at the second side edge 44. In one embodiment, each of the end tabs 46 and 48 is generally rectangular in shape with rounded corners, and is positioned such that axially outer edges 46A and 48A of the first and second end tabs 46 and 48 align with the first and second side edges 42 and 44, respectively. The first end tab 46 has an axial (or longitudinal) dimension $D_3$, and the second end tab 48 has an axial dimension $D_4$. In one embodiment, $D_3$ is greater than $D_4$ for assembly foolproofing purposes. A ratio of end tab dimensions $D_3$ to $D_4$ can be proportional to a ratio of key slot offset dimensions $D_1$ to $D_2$.

A first cutout window 50 is formed in the top foil 32 at the first side edge 42 adjacent to the bent region 38, and a second cutout window 52 is formed in the top foil 32 at the second side edge 44 adjacent to the bent region 38. The first and second cutout windows 50 and 52 in the top foil 32 have shapes that correspond to the shapes of the first and second end tabs 46 and 48, respectively. In the illustrated embodiment, the cutout windows 50 and 52 are each generally rectangular in shape. In addition, first and second bump foil cutout windows can be formed at opposite edges of the bump foil 28 adjacent to the bend end 34. These bump foil cutout windows can have shapes that correspond to those of the first and second cutout windows 50 and 52 in the top foil 32, and can be aligned with first and second cutout windows 50 and 52 in the top foil 32 as well. Engagement edges 50E and 52E are defined in the top foil 30 at the first and second cutout windows 50 and 52, respectively. The engagement edges 50E and 52E are arranged generally perpendicular to the axis A, and extend along the top foil 30 through at least a portion of the bent region 38.

When the bearing assembly 10 is fully assembled, the first and second end tabs 46 and 48 are each inserted into the first and second cutout windows 50 and 52, respectively, in the top foil 32. In this configuration, the end tabs 46 and 48 are each "straight" in that both generally retain the substantially cylindrical shape of the top foil 32. This "straight" end tab configuration eliminates the necessity of permanently bending the end tabs 46 and 48 when fabricating and assembling the bearing assembly 10, which can reduce the complexity of fabrication and assembly processes and thereby reduce costs. When inserted into the cutout windows 50 and 52 in the top foil 32, skewing forces, which tend to move the top foil 32 axially, cause the end tabs 46 and 48 to engage the respective engagement edges 50E and 52E of the top foil 30 that, in turn, are limited from skewing movement because the bent region 38 engages the key slot 22. Engagement between the end tabs 46 and 48 and the engagement edges 50E and 52E reduces or eliminates skewing of the free end 40 of the top foil 32, and thereby helps maintain desired operation of the bearing assembly 10. Engagement contact between the end tabs 46 and 48 and the engagement edges 50E and 52E can occur at the bent region 38, so that torque imparted to a rotatable component supported by the bearing assembly 10 by the end tabs 46 and 48 is reduced or eliminated. It should be noted that dimensions of the cutout windows 50 and 52, particularly in the axial direction, can be slightly larger than those of the end tabs 46 and 48 in order to allow a gap to be formed between those structures at a suitably small tolerance for assembly. Moreover, where cutout windows are formed in the bump foil 28, the end tabs 46 and 48 can further extend into the bump foil cutout windows and expose the end tabs 46 and 48 to the inner diameter surface 16 of the journal sleeve 12, allowing contact therebetween.

In one embodiment, a selected one of the cutout windows 50 can optionally have a generally circumferential dimension that is smaller than a generally circumferential dimension of the corresponding end tab 46, so that insertion of the end tab 46 into that selected cutout window 50 must be done generally axially from the first end 18 of the journal sleeve 12. In other words, by making the selected cutout window 50 smaller than the corresponding end tab 46, that end tab 46 cannot be inserted into the selected cutout window 50 in a generally radially direction. The other cutout window 52 must then generally be larger than the corresponding end tab 48 in a generally circumferential dimension to enable generally radial insertion without deforming the top foil 32. Such an embodiment allows the selected cutout window 50 to be smaller for better aerodynamic performance and less loss of pressurized working fluid during bearing assembly 10 operation, as well as providing further assembly foolproofing benefits. It should be understood that either cutout window 50 or 52 and corresponding end tab 46 or 48 could have this configuration in alternative embodiments.

Figure 6:
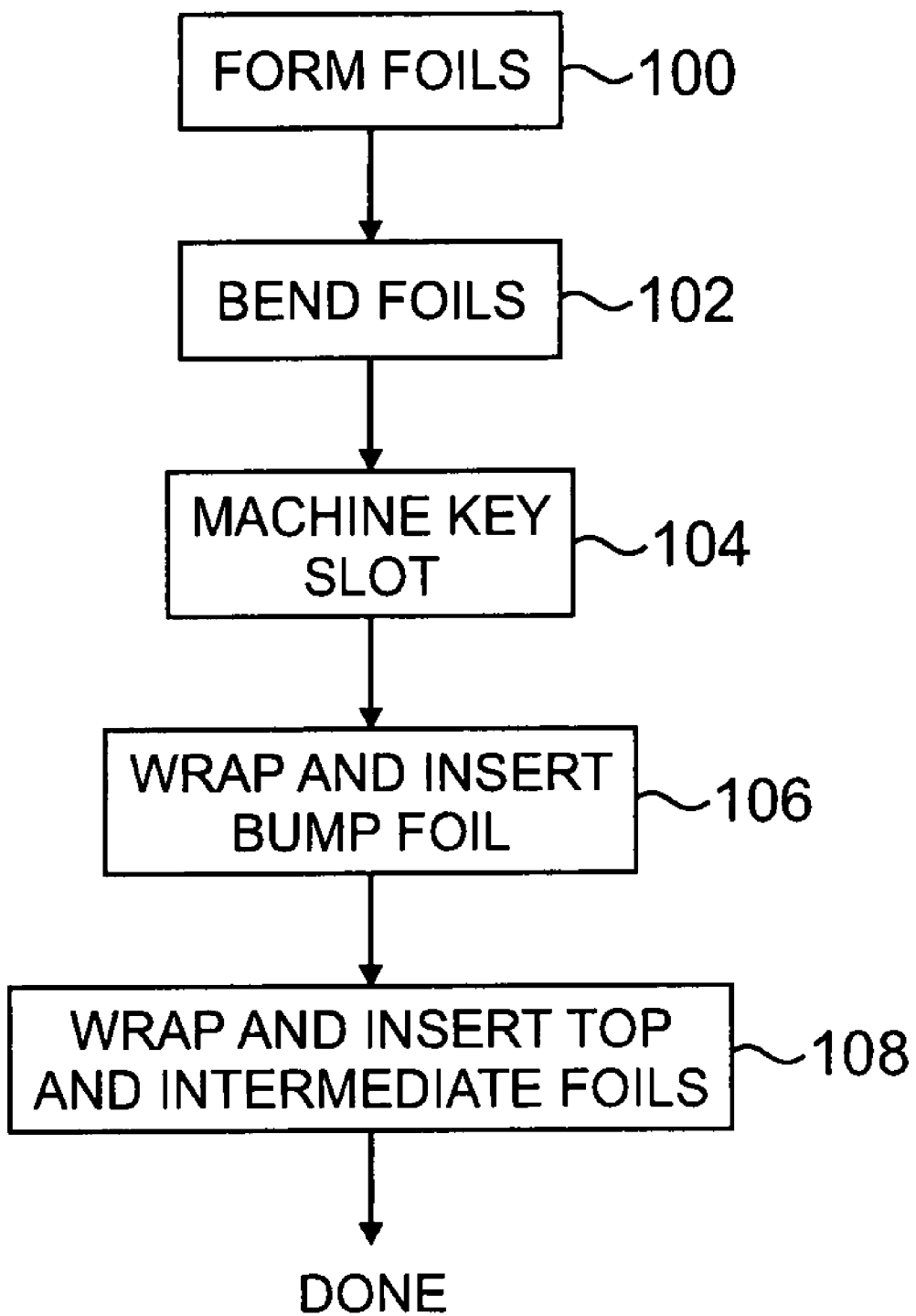
FIG. 6 is a flow chart of a method of manufacturing the hydrodynamic fluid film journal bearing assembly.

FIG. 6 is a flow chart of a method of fabricating and assembling the bearing assembly 10. The method includes forming the bump foil 28, the intermediate foil 30 and the top foil 32 (step 100). As noted above, the intermediate foil 30 and the top foil 32 can be made from separate sheets attached together or can be a made from a unitary sheet. Forming the foils at step 100 can include cutting the foils to shape, and defining all cutout windows (e.g., through stamping, punching, electrical discharge machining, or other suitable processes). The formed foils are then bent (step 102), which can include forming corrugations and a bent end 34 in the top foil 28, and forming the bent region 38 where the intermediate foil 30 and the top foil 32 join. As noted above, bending at step 102 does not require bending the first and second end tabs 46 and 48 of the top foil 32. Bending the end tabs 46 and 48 adds to the complexity of manufacturing operations. Also, such bending is permanent and cannot be readily undone to rework a selected part. By eliminating the need to bend the end tabs 46 and 48 according to the present invention, the top foil 32 can be more readily reworked during fabrication and assembly of the bearing assembly 10, thereby helping to reduce the amount of scrap produced and to reduce manufacturing costs.

In addition, the method includes machining the key slot 22 in the journal sleeve 12 (step 104). Electrical discharge machining (EDM) techniques or cutter wheels can be used to form the key slot 22. Because the key slot 22 can have a relatively simple shape and is formed all the way through the journal sleeve 12 between its outer and inner diameter surfaces 14 and 16, EDM techniques can be performed from either the exterior or interior of the journal sleeve 12 in a relatively simple manner and without undesired heating that can cause runout between the outer and inner diameter surfaces 14 and 16. The key slot 22 is also relatively small, having a relatively short axial length. These features of the present invention represent a substantial simplification over complicated techniques required to form complex keyways in prior art hydrodynamic fluid film journal bearing assemblies. Although shown in FIG. 6 as occurring after steps 100 and 102, it should be understood that machining the key slot 22 (step 104) can occur in a different order in alternative embodiments. It should also be noted that other features of the journal sleeve 12, such as defining the outer and inner diameter surfaces 14 and 16, can be formed using conventional techniques.

Once the components of the bearing assembly 10 are fabricated, the foils can then be wrapped and inserted into the journal sleeve 12. The bump foil 28 is wrapped in a generally cylindrical shape and the bent end 34 is at least partially inserted into the key slot 22 (step 106). The intermediate foil 30 and the top foil 32, which are joined together, are also wrapped and inserted into the journal sleeve 12 (step 108). The intermediate foil 30 and the top foil 32 are reverse rolled upon each other in step 108 to form a generally cylindrical shape, with the top foil 32 located radially inward from the intermediate foil 30. Also as part of step 108, the bent region 38, wherein the intermediate foil 30 and the top foil 32 join, is at least partially inserted into the key slot 22 in the journal sleeve 12, and the end tabs 46 and 48 at the free end 40 of the top foil 32 are inserted into the cutout windows 50 and 52 of the top foil 32 (as well as into any cutout windows in the bump foil 28). Once fabrication and assembly of the bearing assembly 10 is complete, the assembly 10 can be mounted on a support housing on o-rings and a rotatable component (e.g., a shaft) inserted through the bearing assembly 10 in a conventional manner. It should be noted that the fabrication process can include other steps not specifically mentioned above, such as heat treatment.

The bearing assembly 10 is configured to support a rotatable component for rotation in a particular direction (clockwise with respect to the assembly 10 as shown in cross-section in FIG. 4). The finished bearing assembly 10 must therefore have its foils 28, 30 and 32 arranged in a particular manner. In order to reduce the risk of inaccurate assembly, foolproofing features are provided by the bearing assembly 10. For example, the key slot 22 is axially (or longitudinally) offset. Moreover, the first and second end tabs 46 and 48 have different axial dimensions. Such foolproofing features help ensure that the bearing assembly 10 can be assembled in only the proper manner, by ensuring that the bent end 34 of the bump foil 28 and the bent region 38 of the joined intermediate and top foils 30 and 32 only fit within the key slot 22 in one orientation. In other words, ensuring that the first side edge 42 of the top foil 32 is proximate to the first end 18 of the journal sleeve 12, and the second side edge 44 of the top foil 32 is proximate to the second end 20 of the journal sleeve 12. Inserting the bent end 34 and the bent region 38 in an improper orientation, if possible, would result in a gross misalignment of the side edges 42 and 44 of the top foil 32 with respect to the ends 18 and 20 of the journal bearing 12, for instance, which would provide an immediate indication that assembly is improper.

Although the present invention, has been described with reference to preferred embodiments, workers skilled in the art will recognize that changes may be made in form and detail without departing from the spirit and scope of the invention.

What is claimed is:

1. A hydrodynamic fluid film journal bearing assembly comprising:
    a journal sleeve having a key slot formed therein in a substantially longitudinal direction and an inner diameter surface;
    a bump foil wrapped in a substantially cylindrical shape adjacent to the journal sleeve, wherein the bump foil has a bent end portion engaged with the key slot;
    an intermediate foil wrapped in a substantially cylindrical shape adjacent to the bump foil;
    a top foil wrapped in a substantially cylindrical shape adjacent to the intermediate foil, wherein the top foil and the intermediate foil are joined at a bent region that engages the key slot;
    a first top foil cutout window formed in the top foil adjacent to the bent region; and
    a first end tab formed at a free end of the top foil, wherein the first end tab is wrapped with the top foil in the substantially cylindrical shape of the top foil and extends into the first top foil cutout window to reduce skewing of the top foil.

2. The assembly of claim 1 and further comprising:
    a first bump foil cutout window formed in the bump foil adjacent to the bend end portion, wherein the first end tab extends into the first bump foil cutout window such that the first end tab can contact the inner diameter surface of the journal sleeve.

3. The assembly of claim 1 and further comprising:
    a second end tab formed at the free end of the top foil, wherein the second end tab is positioned at an opposite side edge of the top foil from the first end tab; and
    a second top foil cutout window formed in the top foil adjacent to the key slot, wherein the second end tab extends into the second top foil cutout window to reduce skewing of the top foil.

4. The assembly of claim 3 and further comprising:
    a second bump foil cutout window formed in the bump foil adjacent to the bent end portion, wherein the second end tab extends into the second bump foil cutout window such that the second end tab can contact the inner diameter surface of the journal sleeve.

5. The assembly of claim 3, wherein the first end tab has a first longitudinal dimension and the second end tab has a second longitudinal dimension that is different from the first longitudinal dimension for assembly foolproofing.

6. The assembly of claim 1, wherein the first top foil cutout window has a smaller dimension than the first end tab in a generally circumferential direction.

7. The assembly of claim 1, wherein the key slot is defined through an entire thickness of the journal sleeve from the inner diameter surface to an opposite outer diameter surface.

8. The assembly of claim 1, wherein the key slot is longitudinally offset with respect to a longitudinal length of the journal sleeve.

9. The assembly of claim 1, wherein the key slot is elongate and substantially rectangular in shape.

10. The assembly of claim 1, wherein the intermediate foil and the top foil are formed from a single integral sheet.

11. A hydrodynamic fluid film journal bearing assembly comprising:
- a journal sleeve having an inner diameter surface and an opposite outer diameter surface;
- a key slot formed in the journal sleeve, wherein the key slot extends between the inner diameter surface and the opposite outer diameter surface of the journal sleeve, and wherein the key slot has an elongate rectangular shape that is arranged in a substantially axial direction with respect to an axis defined by the journal sleeve; and
- a first foil projecting into the key slot such that the key slot retains the first foil relative to the journal sleeve,
- a first foil cutout window formed in the foil' and
- a first end tab formed at a free end of the foil, where the first end tab extends into the first top foil cutout window to reduce skewing of the first foil.

12. The assembly of claim 11, wherein the first foil comprises:
- an intermediate foil portion wrapped in a generally cylindrical shape; and
- a top foil portion wrapped in a generally cylindrical shape adjacent to the intermediate foil, wherein the top foil and the intermediate foil are joined at a bent region that projects into the key slot in order to retain the bent region relative to the journal sleeve.

13. The assembly of claim 12, wherein the intermediate foil and the top foil are formed from a single integral sheet.

14. The assembly of claim 12 and further comprising:
- a bump foil wrapped in a generally cylindrical shape and positioned substantially between the journal sleeve and the intermediate foil portion of the first foil, wherein the bump foil has a bent end portion engaged with the key slot.

15. The assembly of claim 14 and further comprising:
- a first bump foil cutout window formed in the bump foil adjacent to the bent end portion, wherein the first end tab extends into the first bump foil cutout window such that the first end tab can contact the inner diameter surface of the journal sleeve.

16. The assembly of claim 14, wherein the first end tab is formed at a side edge of the top foil.

17. The assembly of claim 14 and further comprising:
- a second end tab formed at the free end of the top foil, wherein the second end tab is positioned at an opposite side edge of the top foil from the first end tab; and
- a second top foil cutout window formed in the top foil adjacent to the key slot, wherein the second end tab extends into the second top foil cutout window to reduce skewing of the top foil.

18. The assembly of claim 17, wherein the first end tab has a first axial dimension and the second end tab has a second axial dimension that is different from the first axial dimension for assembly foolproofing.

19. The assembly of claim 11, wherein the key slot is axially offset with respect to an axial length of the journal sleeve.

20. The assembly of claim 11, wherein the first top foil cutout window has a smaller dimension than the first end tab in a generally circumferential direction.

21. A method of manufacturing a hydrodynamic fluid film journal bearing assembly that includes a journal sleeve, a bump foil, an intermediate foil and a top foil, the method comprising:
- forming a top foil shape that defines a first top foil cutout window at a first side edge of the top foil adjacent to the bent region and a first end tab at a free end of the top foil at the first side edge of the top foil;
- forming a bent region where the top foil and the intermediate foil join;
- forming a bend at a first end of the bump foil;
- machining a key slot through the journal sleeve between opposite inner and outer diameter surfaces of the journal sleeve;
- wrapping the bump foil into a substantially cylindrical shape;
- inserting the bend at the first end of the bump foil into the key slot in the journal sleeve;
- wrapping the intermediate foil in a substantially cylindrical shape;
- wrapping the top foil and the intermediate foil adjacent to the intermediate foil;
- inserting the bent region where the top foil and intermediate foils join into the key slot such that the intermediate foil is adjacent to the bump foil; and
- inserting the first end tab into the first top foil cutout window.

22. The method of claim 21, wherein the step of forming a top foil shape includes defining a second top foil cutout window at a second side edge of the top foil adjacent to the bent region and defining a second end tab at the second side edge of the top foil at the free end of the top foil, the method further comprising:
- inserting the second end tab into the second top foil cutout window.

23. The method of claim 21, wherein the step of machining a key slot through the journal sleeve between opposite inner and outer diameter surfaces of the journal sleeve comprises electric discharge machining.

24. The method of claim 21, wherein the step of inserting the first end tab into the first top foil cutout window does not require that the first end tab be bent.

* * * * *